(12) United States Patent
Suzuki

(10) Patent No.: US 11,930,285 B2
(45) Date of Patent: Mar. 12, 2024

(54) IMAGE SENSING DEVICE HAVING A NORMAL MODE AND A MULTI-SAMPLING MODE AND OPERATING METHOD THEREOF

(71) Applicant: SK hynix Inc., Gyeonggi-do (KR)

(72) Inventor: Hajime Suzuki, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/726,002

(22) Filed: Apr. 21, 2022

(65) Prior Publication Data

US 2023/0124596 A1   Apr. 20, 2023

(30) Foreign Application Priority Data

Oct. 19, 2021   (KR) .................. 10-2021-0139399

(51) Int. Cl.
    *H04N 25/616*   (2023.01)
    *H04N 25/46*    (2023.01)
    *H04N 25/709*   (2023.01)
    *H04N 25/71*    (2023.01)
    *H04N 25/77*    (2023.01)

(52) U.S. Cl.
    CPC .......... *H04N 25/616* (2023.01); *H04N 25/46* (2023.01); *H04N 25/709* (2023.01); *H04N 25/745* (2023.01); *H04N 25/77* (2023.01)

(58) Field of Classification Search
    CPC .... H04N 25/616; H04N 25/709; H04N 25/46; H04N 25/745; H04N 25/77; H04N 25/75; H04N 25/60
    See application file for complete search history.

(56) References Cited

U.S. PATENT DOCUMENTS

| | | | |
|---|---|---|---|
| 9,185,316 B2 | 11/2015 | Cheon et al. | |
| 9,549,138 B2* | 1/2017 | Yoshida | H04N 25/75 |
| 2012/0138775 A1* | 6/2012 | Cheon | H04N 25/75 |
| | | | 250/214.1 |
| 2013/0235240 A1* | 9/2013 | Yoshida | H04N 25/778 |
| | | | 348/302 |
| 2020/0014874 A1 | 1/2020 | Kawazu et al. | |

* cited by examiner

*Primary Examiner* — Marly S Camargo
(74) *Attorney, Agent, or Firm* — IP & T GROUP LLP

(57) ABSTRACT

Disclosed is an image sensing device including a plurality of selectors suitable for generating a plurality of selected pixel signals corresponding to one of a plurality of pixel signals; a plurality of signal converters suitable for: setting a plurality of initial voltages which are different from one another, on the basis of a plurality of initialization signals during an initialization period, and generating a plurality of converted pixel signals to which the plurality of initial voltages are respectively reflected, on the basis of the plurality of selected pixel signals and a ramp signal during a readout period; and a calculation circuit suitable for averaging the plurality of converted pixel signals.

13 Claims, 5 Drawing Sheets

IMAGE SENSING DEVICE HAVING A NORMAL MODE AND A MULTI-SAMPLING MODE AND OPERATING METHOD THEREOF

CROSS-REFERENCE TO RELATED APPLICATION(S)

This application claims priority under 35 U.S.C. § 119 to Korean Patent Application No. 10-2021-0139399, filed on Oct. 19, 2021, the disclosure of which is incorporated herein by reference in its entirety.

BACKGROUND

1. Field

Various embodiments of the present disclosure relate to a semiconductor design technique, and more particularly, to an image sensing device and an operating method thereof.

2. Description of the Related Art

Image sensing devices are devices for capturing images using the property of a semiconductor which reacts to light. Image sensing devices may be roughly classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensing device for reducing noise included in a pixel signal.

In accordance with an embodiment of the present disclosure, an image sensing device may include: a plurality of selectors suitable for generating a plurality of selected pixel signals corresponding to one of a plurality of pixel signals; a plurality of signal converters suitable for: setting a plurality of initial voltages which are different from one another, on the basis of a plurality of initialization signals during an initialization period, and generating a plurality of converted pixel signals to which the plurality of initial voltages are respectively reflected, on the basis of the plurality of selected pixel signals and a ramp signal during a readout period; and a calculation circuit suitable for averaging the plurality of converted pixel signals.

In accordance with an embodiment of the present disclosure, an image sensing device may include: a pixel array suitable for generating a plurality of pixel signals; a selection circuit suitable for generating a plurality of selected pixel signals corresponding to at least one of the plurality of pixel signals; a signal conversion circuit suitable for setting a plurality of initial voltages on the basis of a ramp signal and a plurality of initialization signals during an initialization period, and generating a plurality of converted pixel signals to which the plurality of initial voltages are respectively reflected, on the basis of the plurality of selected pixel signals and the ramp signal during a readout period; and a calculation circuit suitable for averaging the plurality of converted pixel signals.

In accordance with an embodiment of the present disclosure, an operating method of an image sensing device may include: setting a plurality of initial voltages; generating a plurality of pixel signals to which the plurality of initial voltages are respectively reflected; generating a plurality of digital signals on the basis of the plurality of pixel signals and a ramp signal; and calculating an average of the plurality of digital signals.

In accordance with an embodiment of the present disclosure, an image sensing device may include: a timing control circuit suitable for generating M number of initialization signals, which respectively stay enabled different amounts of time during an initialization period; and M number of converters each including: a comparator suitable for generating a corresponding comparison signal at an output node by comparing a ramp signal provided to a first input node and a comparison pixel signal provided to a second input node; a switch suitable for coupling the output node and the second input node while a corresponding one of the initialization signals stays enabled; a capacitive circuit coupled between the second input node and a node, through which a pixel signal is provided during a readout period; a counter suitable for generating a corresponding converted pixel signal based on the corresponding comparison signal and a dock signal; and a calculator suitable for averaging the M number of converted pixel signals to generate an average pixel signal including an average noise.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
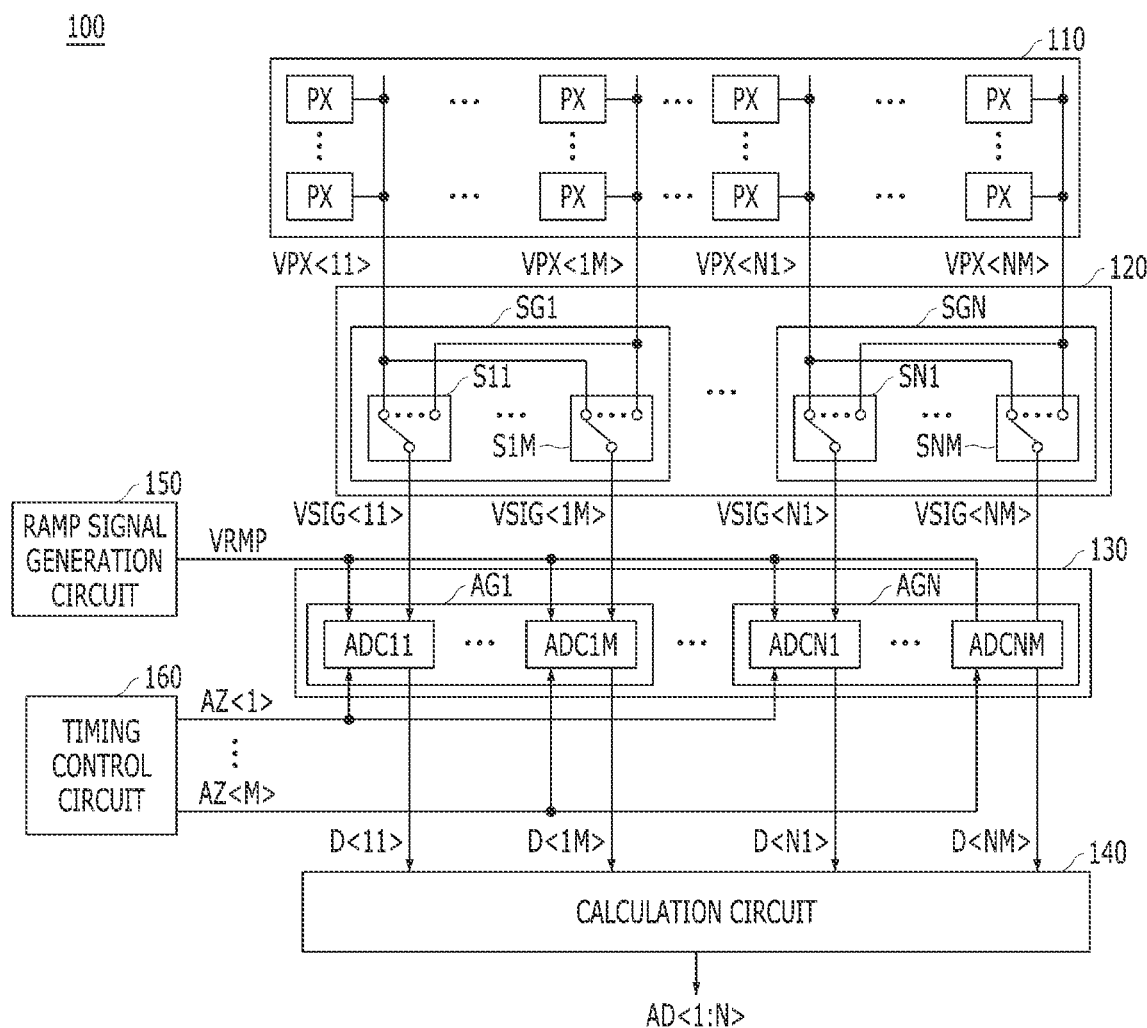
FIG. 1 is a block diagram illustrating an image sensing device in accordance with an embodiment of the present disclosure.

FIG. 1 is a block diagram illustrating an image sensing device 100 in accordance with an embodiment.

Referring to FIG. 1, the image sensing device 100 may include a pixel array 110, a selection circuit 120, a signal conversion circuit 130, a calculation circuit 140, a ramp signal generation circuit 150 and a timing control circuit 160.

The pixel array 110 may include a plurality of pixels PX disposed at intersections of a plurality of rows and a plurality of columns. The plurality of pixels PX may output a plurality of pixel signals VPX<11> to VPX<NM> through a plurality of column lines during a plurality of row line periods. For example, pixels arranged in a first row among the plurality of pixels PX may output the plurality of pixel signals VPX<11> to VPX<NM> through the plurality of column lines during a first row line period, and pixels arranged in a second row among the plurality of pixels PX may output the plurality of pixel signals VPX<11> to VPX<NM> through the plurality of column lines during a second row line period. Each of the plurality of pixel signals VPX<11> to VPX<NM> may be an analog signal.

The selection circuit 120 may select at least one of the plurality of pixel signals VPX<11> to VPX<NM> according to a mode, and output the selected pixel signal as a plurality of selected pixel signals VSIG<11> to VSIG<NM> through a plurality of selection lines. For example, the selection circuit 120 may output the plurality of selected pixel signals VSIG<11> to VSIG<NM> by allowing the plurality of pixel signals VPX<11> to VPX<NM> to correspond one-to-one to the plurality of selection lines in a normal mode, and output the plurality of selected pixel signals VSIG<11> to VSIG<NM> by allowing at least one of the plurality of pixel signals VPX<11> to VPX<NM> to correspond one-to-many to the plurality of selection lines in a multi-sampling mode.

The selection circuit 120 may include first to $N^{th}$ selection groups SG1 to SGN, where "N" is a natural number equal to or greater than 1. The first to $N^{th}$ selection groups SG1 to SGN may include first to $M^{th}$ selectors S11 to S1M, . . . , and SN1 to SNM, respectively, where "M" is a natural number equal to or greater than 2. The first selection group SG1 is representatively described among the first to $N^{th}$ selection groups SG1 to SGN. The first to $M^{th}$ selectors S11 to S1M included in the first selection group SG1 may be coupled to first to $M^{th}$ column lines, respectively, through which first to $M^{th}$ pixel signals VPX<11> to VPX<1M> are outputted among the plurality of column lines and first to $M^{th}$ selection lines, respectively, through which first to $M^{th}$ selected peel signals VSIG<11> to VSIG<1M> are outputted among the plurality of selection lines. The first to $M^{th}$ selectors S11 to S1M may couple the first to $M^{th}$ column lines to the first to $M^{th}$ selection lines in a one-to-one manner in the normal mode, and couple one of the first to $M^{th}$ column lines to the first to $M^{th}$ selection lines in the mufti-sampling mode.

The signal conversion circuit 130 may set first to $M^{th}$ initial voltages on the basis of a ramp signal VRMP and first to $M^{th}$ initialization signals AZ<1:M> during an initialization period P1, and generate a plurality of converted pixel signals D<11> to D<NM> to which the first to $M^{th}$ initial voltages are reflected, on the basis of the plurality of selected pixel signals VSIG<11> to VSIG<1M> and the ramp signal VRMP during a readout period P2. Each of the plurality of converted pixel signals D<11> to D<NM> may be a digital signal.

The signal conversion circuit 130 may include first to $N^{th}$ signal conversion groups AG1 to AGN. The first to $N^{th}$ signal conversion groups AG1 to AGN may include first to $M^{th}$ signal converters ADC11 to ADC1M, . . . , and ADCN1 to ADCNM, respectively. The first signal conversion group AG1 is representatively described among the first to $N^{th}$ signal conversion groups AG1 to AGN. The first to $M^{th}$ signal converters ADC11 to ADC1M included in the first signal conversion group AG1 may receive the respective first to $M^{th}$ selected pixel signals VSIG<11> to VSIG<1M> and the respective first to $M^{th}$ initialization signals AZ<1:M>, receive the ramp signal VRMP in common, and generate the first to $M^{th}$ converted pixel signals D<11> to D<1M>.

The calculation circuit 140 may be enabled in the multi-sampling mode, and be disabled in the normal mode. The calculation circuit 140 may calculate an average of the plurality of converted pixel signals D<11> to D<NM> for each group to generate first to $N^{th}$ average pixel signals AD<1:N>. That is, the calculation circuit 140 may generate the first average pixel signal AD<1> as an average of a group of the converted pixel signals D<11> to D<1M>, the second average pixel signal AD<2> as an average of a group of the converted pixel signals D<21> to D<2M>, . . . and the $N^{th}$ average pixel signal AD<N> as an average of a group of the converted pixel signals D<N1> to D<NM>). For example, the calculation circuit 140 may calculate an average of the first to $M^{th}$ converted pixel signals D<11> to D<1M> outputted from the first signal conversion group AG1 to generate the first average pixel signal AD<1>, and may calculate an average of the first to $M^{th}$ converted pixel signals D<N1> to D<NM> outputted from the $N^{th}$ signal conversion group AGN to generate the $N^{th}$ average pixel signal AD<N>. The first average pixel signal AD<1> may correspond to one pixel signal VPX<1x> corresponding to one pixel selected by the first selection group SG1. In particular, the first average pixel signal AD<1> may be a signal from which noise derived (or caused) from the one pixel (hereinafter referred to as "pixel noise") and noise derived from or related to the first signal conversion group AG1 (hereinafter referred to as "conversion noise") are reduced as compared with the one pixel signal VPX<1x>.

The ramp signal generation circuit 150 may generate the ramp signal VRMP that ramps with a predetermined slope during the initialization period P1 and ramps with a predetermined pattern during the readout period P2. For example, the ramp signal VRMP may ramp within a first voltage range during the initialization period P1, ramp within a second voltage range during a reset period P21 of the readout period P2, and ramp within a third voltage range, which is different from the second voltage range, during a signal period P22 of the readout period P2 (refer to FIG. 3). The first voltage range may be the same as or different from the second voltage range. For example, the first voltage range may be equal to or smaller than the second voltage range. The slope of the ramp signal VRMP generated during the initialization period P1 and the slope of the ramp signal VRMP generated during the reset period P21 may be the same as or different from each other.

The timing control circuit 160 may generate the first to $M^{th}$ initialization signals AZ<1:M> that are sequentially deactivated during the initialization period P1. For example, the first initialization signal AZ<1> among the first to $M^{th}$ initialization signals AZ<1:M> may be deactivated first, and the $M^{th}$ initialization signal AZ<M> among the first to $M^{th}$ initialization signals AZ<1:M> may be deactivated last.

Figure 2:
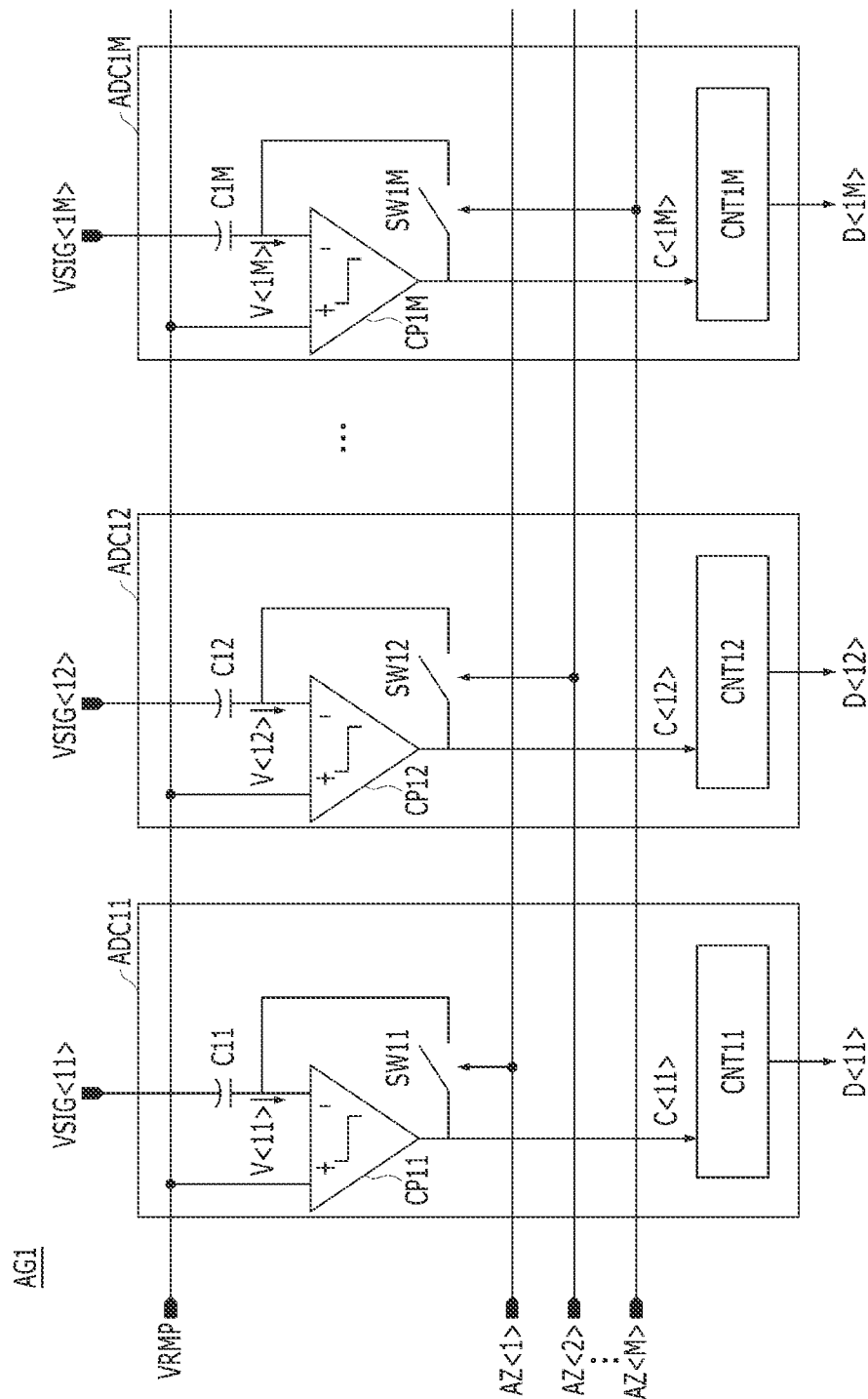
FIG. 2 is a circuit diagram illustrating a signal conversion group illustrated in FIG. 1 in accordance with an embodiment of the present disclosure.

FIG. 2 is a circuit diagram illustrating an example of the first signal conversion group AG1 illustrated in FIG. 1 in accordance with an embodiment of the present disclosure.

The first signal conversion group AG1 may include the first to $M^{th}$ signal converters ADC11 to ADC1M.

The first signal converter ADC11 may include a first comparator CP11, a first switch SW11, a first capacitor C11 and a first counter CNT11.

The first comparator CP11 may receive the ramp signal VRMP through a positive input terminal (+) thereof, receive a first comparison pixel signal V<11> through a negative input terminal (−) thereof, and output a first comparison signal C<11> through an output terminal thereof. The first comparator CP11 may compare the ramp signal VRMP with the first comparison pixel signal V<11>, and generate the first comparison signal C<11> corresponding to the comparison result.

The first switch SW11 may be coupled between the negative input terminal (−) and the output terminal. The first switch SW11 may be switched based on the first initialization signal AZ<1>. For example, the first switch SW11 may be shorted based on the activated first initialization signal AZ<1> and be opened based on the deactivated first initialization signal AZ<1>.

The first capacitor C11 may be coupled between the negative input terminal (−) and an output terminal of the first selected pixel signal VSIG<11>. The first capacitor C11 may initialize the negative input terminal (−) to the first initial voltage during the initialization period P1. For example, the first capacitor C11 may sample the first initial voltage, which corresponds to a voltage level of the ramp signal VRMP, when the first switch SW11 is opened in the initialization period P1, and generate the first comparison pixel signal V<11>, to which the first initial voltage is reflected, through the negative input terminal (−) by sampling the first selected pixel signal VSIG<11> during the readout period P2.

The first counter CNT11 may generate the first converted pixel signal D<11> on the basis of the first comparison signal C<11> and a clock signal (not illustrated).

The second signal converter ADC12 may include a second comparator CP12, a second switch SW12, a second capacitor C12 and a second counter CNT12.

The second comparator CP12 may receive the ramp signal VRMP through a positive input terminal (+) thereof, receive a second comparison pixel signal V<12> through a negative input terminal (−) thereof, and output a second comparison signal C<12> through an output terminal thereof. The second comparator CP12 may compare the ramp signal VRMP with the second comparison pixel signal V<12>, and generate the second comparison signal C<12> corresponding to the comparison result.

The second switch SW12 may be coupled between the negative input terminal (−) and the output terminal. The second switch SW12 may be switched based on the second initialization signal AZ<2>. For example, the second switch SW12 may be shorted based on the activated second initialization signal AZ<2> and be opened based on the deactivated second initialization signal AZ<2>.

The second capacitor C12 may be coupled between the negative input terminal (−) and an output terminal of the second selected pixel signal VSIG<12>. The second capacitor C12 may initialize the negative input terminal (−) to the second initial voltage during the initialization period P1. For example, the second capacitor C12 may sample the second initial voltage, which corresponds to a voltage level of the ramp signal VRMP, when the second switch SW12 is opened in the initialization period P1, and generate the second comparison pixel signal V<12>, to which the second initial voltage is reflected, through the negative input terminal (−) by sampling the second selected pixel signal VSIG<12> during the readout period P2. The second initial voltage may have a lower level than the first initial voltage.

The second counter CNT12 may generate the second converted pixel signal D<12> on the basis of the second comparison signal C<12> and the dock signal.

The $M^{th}$ signal converter ADC1M may include an $M^{th}$ comparator CP1M, an $M^{th}$ switch SW1m, an $M^{th}$ capacitor C1M and an $M^{th}$ counter CNT1M.

The $M^{th}$ comparator CP1M may receive the ramp signal VRMP through a positive input terminal (+) thereof, receive an $M^{th}$ comparison pixel signal V<1M> through a negative input terminal (−) thereof, and output an $M^{th}$ comparison signal C<1M> through an output terminal thereof. The $M^{th}$ comparator CP1M may compare the ramp signal VRMP with the $M^{th}$ comparison pixel signal V<1M>, and generate the $M^{th}$ comparison signal C<1M> corresponding to the comparison result.

The $M^{th}$ switch SW1M may be coupled between the negative input terminal (−) and the output terminal. The $M^{th}$ switch SW1M may be switched based on the $M^{th}$ initialization signal AZ<M>. For example, the $M^{th}$ switch SW1M may be shorted based on the activated $M^{th}$ initialization signal AZ<M> and be opened based on the deactivated $M^{th}$ initialization signal AZ<M>.

The $M^{th}$ capacitor C1M may be coupled between the negative input terminal (−) and an output terminal of the $M^{th}$ selected pixel signal VSIG<1M>. The $M^{th}$ capacitor C1M may initialize the negative input terminal (−) to the $M^{th}$ initial voltage during the initialization period P1. For example, the $M^{th}$ capacitor C1M may sample the $M^{th}$ initial voltage, which corresponds to a voltage level of the ramp signal VRMP, when the $M^{th}$ switch SW1M is opened in the initialization period P1, and generate the $M^{th}$ comparison pixel signal V<1M>, to which the $M^{th}$ initial voltage is reflected, through the negative input terminal (−) by sampling the $M^{th}$ selected pixel signal VSIG<1M> during the readout period P2.

The $M^{th}$ counter CNT1M may generate the $M^{th}$ converted pixel signal D<1M> on the basis of the $M^{th}$ comparison signal C<1M> and the clock signal.

Figure 4:
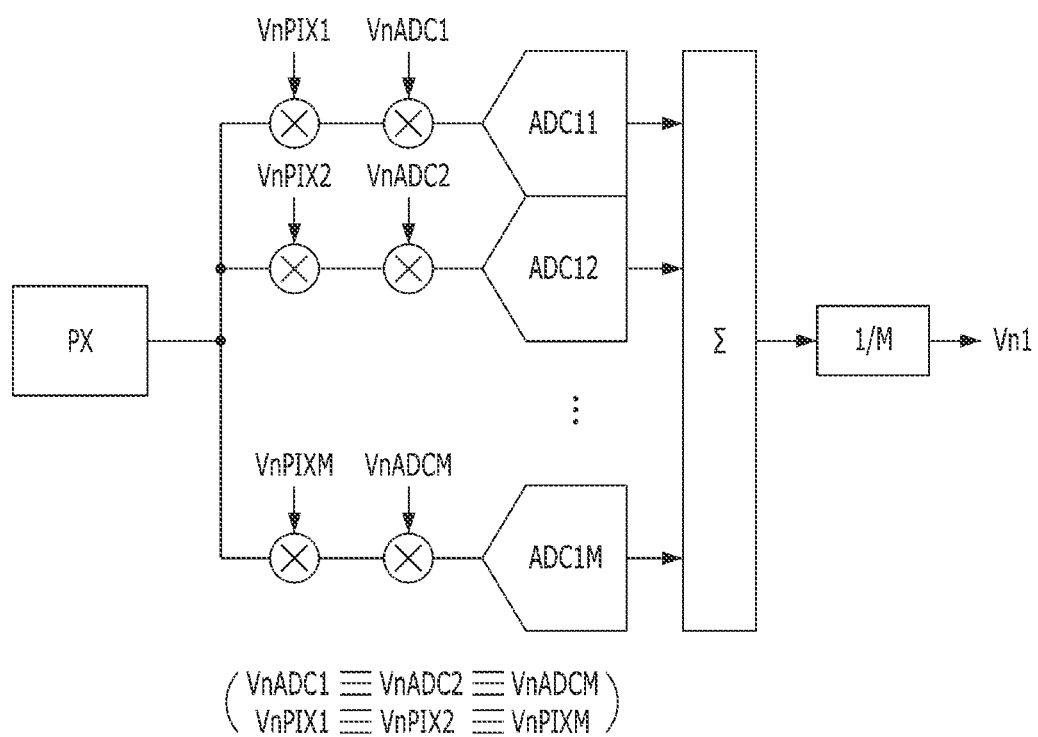
FIG. 4 is a diagram illustrating noise included in a pixel signal in accordance with an embodiment of the present disclosure.
Figure 5:
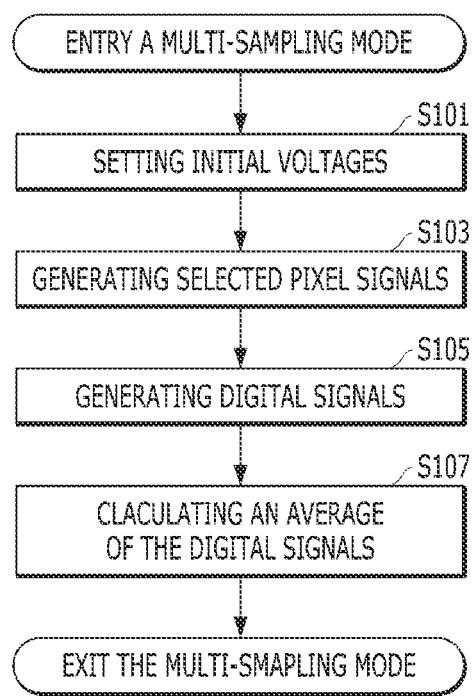
FIG. 5 is a flowchart illustrating the operation of the image sensing device illustrated in FIG. 1 in accordance with an embodiment of the present disclosure.

Hereinafter, an operation of the image sensing device 100 in accordance with an embodiment, which has the above-described configuration, is described with reference to FIGS. 3 to 5. For example, FIGS. 3 to 5 are diagrams illustrating an operation according to the multi-sampling mode, and particularly, an operation related to the first signal conversion group AG1.

Figure 3:
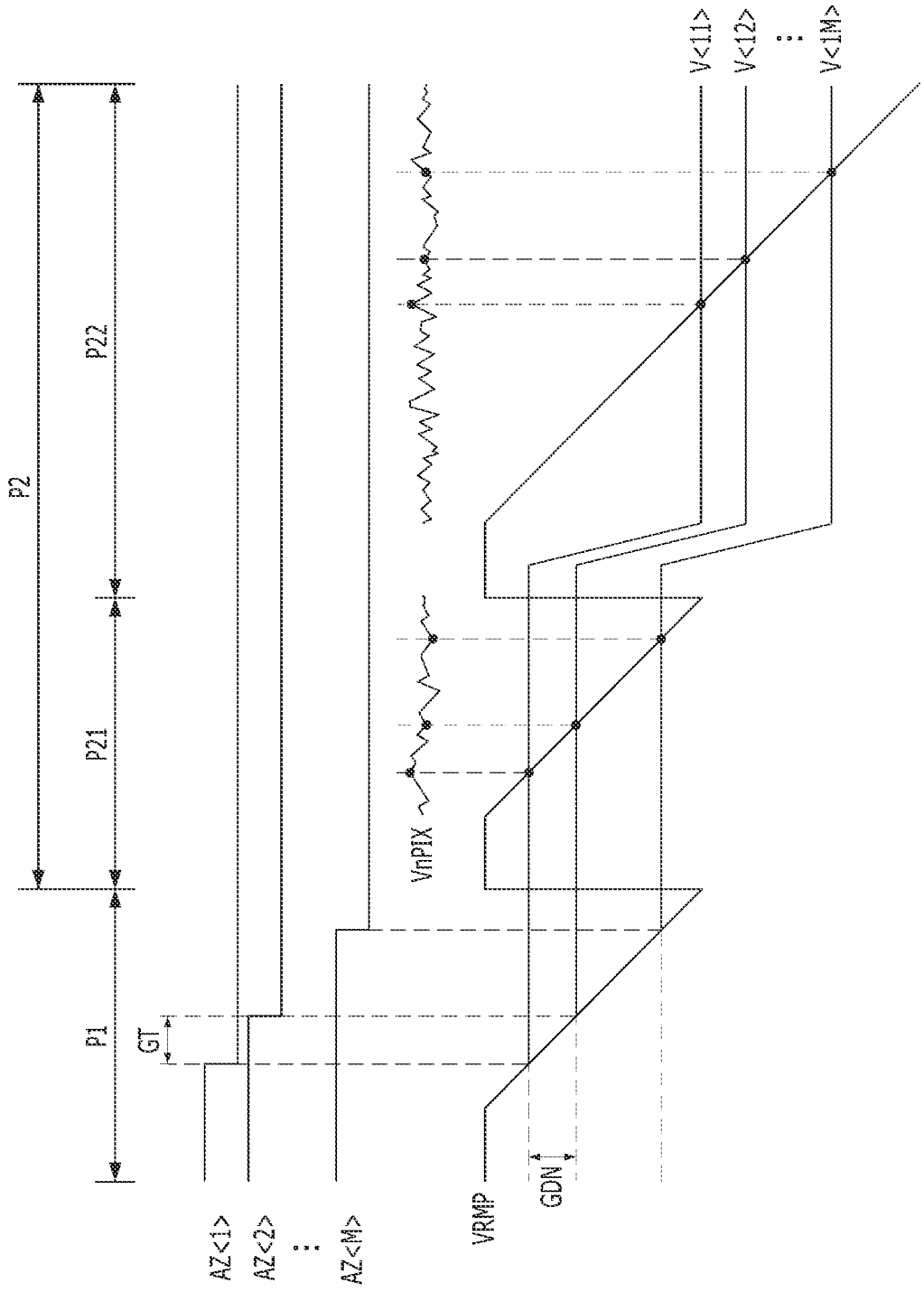
FIG. 3 is a timing diagram illustrating an operation of the image sensing device illustrated in FIG. 1 in accordance with an embodiment of the present disclosure.

FIG. 3 is a timing diagram illustrating an operating method of the image sensing device 100 illustrated in FIG. 1 in accordance with an embodiment of the present disclosure.

Referring to FIG. 3, during the initialization period P1, the ramp signal generation circuit 150 may generate the ramp signal VRMP that ramps within the first voltage range. The first voltage range may be equal to or smaller than the second voltage range. The ramp signal VRMP generated during the initialization period P1 may have the same or different slope as or from the ramp signal VRMP generated during the reset period P21. For example, the slope of the ramp signal VRMP generated during the initialization period P1 may be steeper or gentler than that of the ramp signal VRMP generated during the reset period P21. The ramp signal VRMP may have a gradually lowering voltage level.

During the initialization period P1, the timing control circuit 160 may generate the first to $M^{th}$ initialization signals AZ<1> to AZ<M> that are sequentially deactivated. For example, among the first to $M^{th}$ initialization signals AZ<1> to AZ<M>, the first initialization signal AZ<1> may be deactivated first, and the $M^{th}$ initialization signal AZ<M> may be deactivated last. Accordingly, the first to $M^{th}$ signal converters ADC11 to ADC1M may set the first to $M^{th}$ initial voltages, which have different voltage levels on the basis of the ramp signal VRMP and the first to $M^{th}$ initialization signals AZ<1> to AZ<M>, respectively. For example, the first to $M^{th}$ signal converters ADC11 to ADC1M may sample the first to $M^{th}$ initial voltages as first to $M^{th}$ comparison pixel signals V<11> to V<1M>, respectively. A voltage level difference GDN among the first to $M^{th}$ initial voltages may correspond to a deactivation time interval GT among the first to $M^{th}$ initialization signals AZ<1> to AZ<M>. The deactivation time interval GT among the first to $M^{th}$ initialization signals AZ<1> to AZ<M> may be determined or adjusted according to the slope of the ramp signal VRMP generated during the initialization period P1.

During the readout period P2, the timing control circuit 160 may maintain deactivation states of the first to $M^{th}$ initialization signals AZ<1> to AZ<M>, and the ramp signal generation circuit 150 may generate the ramp signal VRMP that ramps in the predetermined pattern. For example, the ramp signal generation circuit 150 may generate the ramp signal VRMP that ramps within the second voltage range during the reset period P21 of the readout period P2 and ramps within the third voltage range during the signal period P22 of the readout period P2. The ramp signal VRMP may have a voltage level that gradually lowers during the reset period P21, and have a voltage level that gradually lowers during the signal period P22.

During the readout period P2, the pixel array 110 may generate the first to $M^{th}$ pixel signals VPX<11> to VPX<1M> from pixels arranged in one row. For example, the pixel array 110 may generate the first to $M^{th}$ pixel signals VPX<11> to VPX<1M> corresponding to a reset level during the reset period P21, and generate the first to $M^{th}$ pixel signals VPX<11> to VPX<1M> corresponding to a signal level during the signal period P22.

During the readout period P2, the first to $M^{th}$ selectors S11 to S1M may select one pixel signal, for example, VPX<11>, corresponding to one predetermined pixel among the first to $M^{th}$ pixel signals VPX<11> to VPX<1M>, and generate the first to $M^{th}$ selected pixel signals VSIG<11> to VSIG<1M> corresponding to the selected one pixel signal, for example, VPX<11>.

During the readout period P2, the first to $M^{th}$ signal converters ADC11 to ADC1M may generate the first to $M^{th}$ converted pixel signals D<11> to D<1M> to which the first to $M^{th}$ initial voltages are reflected, on the basis of the ramp signal VRMP and the first to $M^{th}$ selected pixel signals VSIG<11> to VSIG<1M>, respectively. For example, the first to $M^{th}$ signal converters ADC11 to ADC1M may generate the first to $M^{th}$ comparison pixel signals V<11> to V<1M> to which the first to $M^{th}$ initial voltages are reflected. The first to $M^{th}$ signal converters ADC11 to ADC1M may compare the first to $M^{th}$ comparison pixel signals V<11> to V<1M> with the ramp signal VRMP, respectively, and generate the first to $M^{th}$ converted pixel signals D<11> to D<1M> corresponding to the comparison result, during the reset period P21. Subsequently, the first to $M^{th}$ signal converters ADC11 to ADC1M may compare the first to $M^{th}$ comparison pixel signals V<11> to V<1M> with the ramp signal VRMP, respectively, and generate the first to $M^{th}$ converted pixel signals D<11> to D<1M> corresponding to the comparison result, during the signal period P22.

Each of the first to $M^{th}$ comparison pixel signals V<11> to V<1M> may include pixel noise VnPIX derived from the one pixel. Since the pixel noise VnPIX is thermal noise that varies randomly, the first to $M^{th}$ comparison pixel signals V<11> to V<1M> may include pixel noise having different analog levels (hereinafter referred to as "first to $M^{th}$ comparison noises VnPIX1 to VnPIXM"). In addition, the first to $M^{th}$ converted pixel signals D<11> to D<1M> may include first to $M^{th}$ conversion noises VnADC1 to VnADCM each having a digital level, which are derived from the first to $M^{th}$ signal converters ADC11 to ADC1M, respectively. The first to $M^{th}$ conversion noises VnADC1 to VnADCM may also be thermal noise that varies randomly.

During the readout period P2 or a subsequent period of the readout period P2, the calculation circuit 140 may calculate the average of the first to $M^{th}$ converted pixel signals D<11> to D<1M>, and generate the first average pixel signal AD<1>. The first to $M^{th}$ comparison noises VnPIX1 to VnPIXM and the first to $M^{th}$ conversion noises VnADC1 to VnADCM may be included in the first average pixel signal AD<1>, but the first to $M^{th}$ comparison noises VnPIX1 to VnPIXM and the first to $M^{th}$ conversion noises VnADC1 to VnADCM may be uncorrelated through the calculation circuit 140.

In an embodiment, an operation of the readout period P2 may be repeatedly performed on the other pixel signals, for example, VPX<12> to VPX<1M>, among the first to $M^{th}$ pixel signals VPX<11> to VPX<1M> after the readout period P2. Alternatively, in an embodiment, an operation of the initialization period P1 and the operation of the readout period P2 may be repeatedly performed on the other pixel signals, for example, VPX<12> to VPX<1M>, among the first to $M^{th}$ pixel signals VPX<11> to VPX<1M> after the readout period P2.

FIG. 4 is a diagram illustrating noise (hereinafter referred to as "first average noise Vn1" included in the first average pixel signal AD<1> in accordance with an embodiment of the present disclosure.

Referring to FIG. 4, the calculation circuit 140 may generate the first average pixel signal AD<1>, which corresponds to the one pixel, through an addition operation Σ and a division operation 1/M. The first average pixel signal AD<1> may include the first average noise Vn1. The relationship among the first average noise Vn1, the first to $M^{th}$ pixel noises VnPIX1 to VnPIXM and the first to $M^{th}$ conversion noises VnADC1 to VnADCM may be represented as shown in Equation 1 below (herein, VnPIX1≡ . . . ≡VnPIXM≡VnPIX, VnADC1≡ . . . ≡VnADCM≡VnADC where "≡" means that respective standard deviations of the noises are the same as one another).

$$\overline{Vn1^2} = \frac{\overline{VnPIX^2}}{M} + \frac{\overline{VnADC^2}}{M} \quad \text{[Equation 1]}$$

Herein, the symbol "—(bar)" may refer to an average. The first average noise Vn1 may be obtained using root mean square (RMS). The first average noise Vn1 may reduce the pixel noise VnPIX and the conversion noise VnADC by $(1/\sqrt{M})$ times. It may be seen that the larger "M" is, the smaller the first average noise Vn1 is.

FIG. 5 is a flowchart illustrating the operating method of the image sensing device 100 illustrated in FIG. 1 in accordance with an embodiment of the present disclosure.

Referring to FIG. 5, the operating method of the image sensing device (100) may include setting the first to $M^{th}$ initial voltages in operation S101, generating the first to $M^{th}$ selected pixel signals VSIG<11> to VSIG<1M> to which the first to $M^{th}$ initial voltages are respectively reflected in operation S103, generating the first to $M^{th}$ converted pixel signals (i.e., digital signals) D<11> to D<1M> on the basis of the first to $M^{th}$ selected pixel signals VSIG<11> to VSIG<1M> and a ramp signal in operation S105, and calculating an average of the first to $M^{th}$ converted pixel signals D<11> to D<1M> in operation S107.

The first to $M^{th}$ selected pixel signals VSIG<11> to VSIG<1M> may correspond to one pixel signal (i.e., the first pixel signal VPX<11>) generated from one pixel. The one pixel signal (i.e., the first pixel signal VPX<11>) may correspond to one signal (i.e., the first average pixel signal AD<1>) obtained by calculating the average of the first to $M^{th}$ converted pixel signals D<11> to D<1M>. The one signal (i.e., the first average pixel signal AD<1>) corresponds to a signal from which a noise derived from the one pixel has been removed.

According to an embodiment of the present disclosure, noise included in a pixel signal may be reduced, and particularly, pixel noise may be reduced as a result of combining a plurality of initialization signals that are sequentially deactivated and a ramp signal that gradually ramps to a lower voltage level.

According to an embodiment of the present disclosure, noise included in a pixel signal may be reduced, which makes it possible to improve a signal to noise ratio of the pixel signal.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image sensing device comprising:
   a plurality of selectors suitable for generating a plurality of selected pixel signals corresponding to one of a plurality of pixel signals;
   a plurality of signal converters suitable for:
   setting a plurality of initial voltages which are different from one another, on the basis of a ramp signal and a plurality of initialization signals during an initialization period, and
   generating a plurality of converted pixel signals to which the plurality of initial voltages are respectively reflected, on the basis of the plurality of selected pixel signals and the ramp signal during a readout period; and
   a calculation circuit suitable for averaging the plurality of converted pixel signals.

2. The image sensing device of claim 1, further comprising:
   a ramp signal generation circuit suitable for generating the ramp signal that ramps during the initialization period in which the plurality of converted pixel signals are not generated and ramps with a predetermined pattern during the readout period; and
   a timing control circuit suitable for generating the plurality of initialization signals that are sequentially deactivated during the initialization period.

3. The image sensing device of claim 2, wherein the ramp signal ramps within a first voltage range during the initialization period, ramps within a second voltage range during a reset period of the readout period, and ramps within a third voltage range during a signal period of the readout period.

4. The image sensing device of claim 3, wherein the first voltage range is the same as or different from the second voltage range, and the third voltage range is different from the second voltage range.

5. The image sensing device of claim 1, wherein each of the plurality of signal converters includes:
   a comparator suitable for comparing the ramp signal inputted through a positive input terminal thereof with a comparison pixel signal inputted through a negative input terminal thereof, and outputting a comparison signal, which corresponds to a result of the comparing, through an output terminal thereof;
   a switch suitable for coupling the negative input terminal and the output terminal based on a corresponding initialization signal among the plurality of initialization signals; and
   a capacitor coupled to the negative input terminal, and suitable for initializing the negative input terminal to a corresponding initial voltage during the initialization period, and generating the comparison pixel signal to which the corresponding initial voltage is reflected, by sampling a corresponding selected pixel signal during the readout period.

6. An image sensing device comprising:
   a pixel array suitable for generating a plurality of pixel signals;
   a selection circuit suitable for generating a plurality of selected pixel signals through a plurality of selection lines by allowing the plurality of pixel signals to correspond one-to-one to the plurality of selection lines in a first mode, and generating the plurality of selected pixel signals through the plurality of selection lines by allowing at least one of the plurality of pixel signals correspond one-to-many to the plurality of selection lines in a second mode;
   a signal conversion circuit suitable for setting a plurality of initial voltages on the basis of a ramp signal and a plurality of initialization signals during an initialization period, and generating a plurality of converted pixel signals to which the plurality of initial voltages are respectively reflected, on the basis of the plurality of selected pixel signals and the ramp signal during a readout period; and
   a calculation circuit suitable for averaging the plurality of converted pixel signals.

7. The image sensing device of claim 6, further comprising:
   a ramp signal generation circuit suitable for generating the ramp signal that ramps during the initialization period and ramps with a predetermined pattern during the readout period; and
   a timing control circuit suitable for generating the plurality of initialization signals that are sequentially deactivated during the initialization period.

8. The image sensing device of claim 7, wherein the ramp signal ramps within a first voltage range during the initialization period, ramps within a second voltage range during a reset period of the readout period, and ramps within a third voltage range during a signal period of the readout period.

9. The image sensing device of claim 8, wherein the first voltage range is the same as or different from the second voltage range, and the third voltage range is different from the second voltage range.

10. The image sensing device of claim 6, wherein the signal conversion circuit includes a plurality of signal converters, each including:

a comparator suitable for comparing the ramp signal inputted through a positive input terminal thereof with a comparison pixel signal inputted through a negative input terminal thereof, and outputting a comparison signal, which corresponds to a result of the comparing, through an output terminal thereof;

a switch suitable for coupling the negative input terminal and the output terminal based on a corresponding initialization signal among the plurality of initialization signals; and a capacitor coupled to the negative input terminal, and suitable for initializing the negative input terminal to a corresponding initial voltage during the initialization period, and generating the comparison pixel signal to which the corresponding initial voltage is reflected, by sampling a corresponding selected pixel signal during the readout period.

11. An operating method of an image sensing device, comprising:

setting a plurality of initial voltages;

generating a plurality of selected pixel signals to which the plurality of initial voltages are respectively reflected, wherein the plurality of selected pixel signals correspond to one pixel signal generated from one pixel;

generating a plurality of digital signals on the basis of the plurality of selected pixel signals and a ramp signal; and calculating an average of the plurality of digital signals, wherein the one pixel signal corresponds to one signal obtained by calculating the average of the plurality of digital signals, and wherein the one signal corresponds to a signal from which a noise derived from the one pixel has been removed.

12. An image sensing device comprising:

a timing control circuit suitable for generating M number of initialization signals, which respectively stay enabled different amounts of time during an initialization period; and M number of converters each including:

a comparator suitable for generating a corresponding comparison signal at an output node by comparing a ramp signal provided to a first input node and a comparison pixel signal provided to a second input node;

a switch suitable for coupling the output node and the second input node while a corresponding one of the initialization signals stays enabled;

a capacitive circuit coupled between the second input node and a node, through which a pixel signal is provided during a readout period;

a counter suitable for generating a corresponding converted pixel signal based on the corresponding comparison signal and a clock signal; and a calculator suitable for averaging the M number of converted pixel signals to generate an average pixel signal including an average noise.

13. The image sensing device of claim 12, wherein the average noise is expressed by a following equation:

$$\overline{Vn1^2} = \frac{\overline{VnPIX^2}}{M} + \frac{\overline{VnADC^2}}{M}, \qquad \text{[Equation]}$$

where "—" represents an average, "Vn1" represents the average noise, "VnPIX" represents a thermal noise included in the pixel signal and "VnADC" represents a thermal noise caused by each of the converters.

\* \* \* \* \*